United States Patent
Ukkola et al.

(10) Patent No.: US 9,071,572 B2
(45) Date of Patent: Jun. 30, 2015

(54) METHOD, APPARATUS AND SYSTEM FOR ADDRESSING RESOURCES

(71) Applicant: SENSINODE OY, Oulu (FI)

(72) Inventors: Sampo Ukkola, Oulu (FI); Zachary Shelby, Sotkamo (FI)

(73) Assignee: ARM FINLAND OY, Oulu (FI)

( * ) Notice: Subject to any disclaimer, the term of this patent is extended or adjusted under 35 U.S.C. 154(b) by 224 days.

(21) Appl. No.: 13/711,795

(22) Filed: Dec. 12, 2012

(65) Prior Publication Data

US 2013/0212215 A1    Aug. 15, 2013

(30) Foreign Application Priority Data

Dec. 21, 2011   (FI) ...................................... 20116301

(51) Int. Cl.
- *G06F 15/16* (2006.01)
- *H04L 29/08* (2006.01)
- *G06F 17/30* (2006.01)
- *H04L 29/12* (2006.01)

(52) U.S. Cl.
CPC ............. *H04L 67/02* (2013.01); *H04L 61/1511* (2013.01); *G06F 17/30876* (2013.01)

(58) Field of Classification Search
CPC ............................... H04L 67/02; H04W 4/005
USPC ................................................ 709/217–219
See application file for complete search history.

(56) References Cited

U.S. PATENT DOCUMENTS

2008/0046593 A1*  2/2008  Ando et al. .................... 709/245
2008/0301562 A1* 12/2008  Berger et al. .................. 715/733

FOREIGN PATENT DOCUMENTS

| EP | 1988688 A2 | 11/2008 |
|---|---|---|
| WO | 2008/026804 A2 | 3/2008 |
| WO | 2008/027615 A1 | 3/2008 |
| WO | 2008/096906 A1 | 8/2008 |
| WO | 2010/055209 A1 | 5/2010 |

OTHER PUBLICATIONS

National Board of Patents and Registration of Finland Application No. 20116301, Search Report dated Sep. 25, 2012.

\* cited by examiner

*Primary Examiner* — Mohamed Wasel
(74) *Attorney, Agent, or Firm* — Barnes & Thornburg LLP

(57) ABSTRACT

An apparatus for addressing resources including a first interface to communicate with end-points, the end-points having resources; a second interface for communicating with web applications; a component for creating an universal resource locator (URL) for a resource, the URL including the IP address, port and path of the resource; a component for creating an abstract universal resource identifier (URI) for the resource, a component configured to receive over the second interface and resolve a look-up URI for the resource, the look-up URI having the address of the apparatus, domain and end-point parameters and metadata related to the resource; and a component configured to link the URL and the abstract URI together and the look-up URI with one or more URLs or abstract URIs.

14 Claims, 6 Drawing Sheets

US 9,071,572 B2

METHOD, APPARATUS AND SYSTEM FOR ADDRESSING RESOURCES

CROSS REFERENCE TO RELATED APPLICATIONS

This patent application claims priority to Finnish Patent Application No. 20116301, filed 21 Dec. 2011, the disclosure of which is incorporated herein by reference in its entirety.

FIELD

Disclosed embodiments relate to a method, an apparatus and a system for addressing resources. In particular, disclosed embodiments relate to addressing resources and web services in networks comprising machine-to machine systems.

BACKGROUND

The following description of background art may include insights, discoveries, understandings or disclosures, or associations together with disclosures not known to the relevant art prior to the present disclosure but provided by the disclosure. Some of such contributions may be specifically pointed out below, whereas other such contributions will be apparent from their context.

In modern communication and computer networks, data exchange between programs and computers is a vital element. Different programs, computers and processors exchange data without human intervention. This kind of communication is usually called machine-to-machine (M2M) communications.

An example of a network technology where M2M communication is widely applied is a low-power wireless network, such as an IEEE 802.15.4 based embedded and sensor network.

Applications running in devices connected to the Internet may need information provided by M2M devices. Traditional addressing method of using and processing Universal Resource Identifiers has certain problems when used in M2M networks. Existing Internet protocols using URI schemes resolve just the FQDN (Fully Qualified Domain Name) part of a Universal Resource Locator URL into an IP address. For example, if the URL is coap://node.example.com/path, the resolved part would be node.example.com. This is a fragile locator that easily breaks when e.g. the node moves.

SUMMARY

Disclosed embodiments provide a solution for addressing and accessing resources offered by M2M devices.

BRIEF DESCRIPTION OF THE DRAWINGS

Disclosed embodiments are described below, by way of example only, with reference to the accompanying drawings, in which.

DETAILED DESCRIPTION OF THE DISCLOSED EMBODIMENTS

Figure 1:
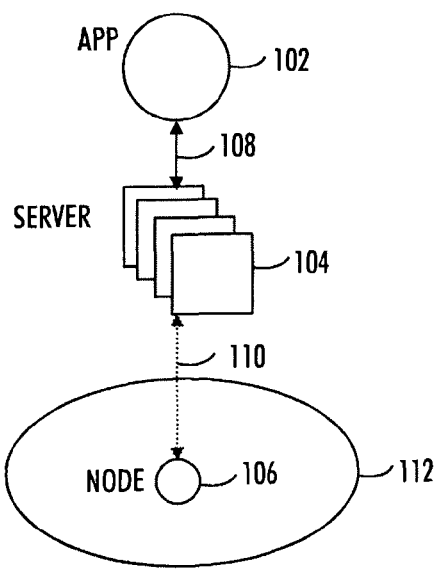
FIG. 1 illustrates an example of a system architecture to which disclosed embodiments may be applied.

A first disclosed embodiment provides an apparatus, comprising a first interface to communicate with end-points operationally connected to the apparatus using a binary web service, the end-points comprising one or more resources; a second interface for communicating with web applications making use of the resources; a component for creating a universal resource locator (URL) for a resource to be used over the first interface, the URL comprising the protocol used to access the resource, the Internet Protocol address, port and path of the resource; a component for creating an abstract universal resource identifier (URI) for the resource to be used over the second interface, the abstract URI comprising an end-point and domain name and path of the resource and being independent of the protocol used to access the resource; a component configured to receive over the second interface and resolve a look-up URI for the resource, the look-up URI comprising the address of the apparatus, optional domain and end-point parameters and optional metadata related to the resource; and a component configured to link the URL and the abstract URI together and the look-up URI with one or more URLs or abstract URIs.

A second disclosed embodiment provides a system, comprising a server and one or more end-points operationally connected to the server using a binary web service, the end-points comprising one or more resources; a first interface in the server to communicate with end-points operationally connected to the apparatus using a binary web service, the end-points comprising one or more resources; a second interface in the server for communicating with web applications making use of the resources; a component in the server for creating a universal resource locator (URL) for a resource to be used over the first interface, the URL comprising the protocol used to access the resource, the Internet Protocol address, port and path of the resource; a component in the server for creating an abstract universal resource identifier (URI) for the resource to be used over the second interface, the abstract URI comprising an end-point and domain name and path of the resource and being independent of the protocol used to access the resource; a component in the server configured to receive over the second interface and resolve a look-up URI for the resource, the look-up URI comprising the address of the apparatus, optional domain and end-point parameters and optional metadata related to the resource; and a component in the server configured to link the URL and the abstract URI together and the look-up URI with one or more URLs or abstract URIs.

A third disclosed embodiment provides a method, comprising communicating with end-points using a binary web service over a first interface, the end-points comprising one or more resources; communicating over a second interface with web applications making use of the resources; creating a universal resource locator (URL) for a resource to be used over the first interface, the URL comprising the protocol used to access the resource, the Internet Protocol address, port and path of the resource; creating an abstract universal resource identifier (URI) for the resource to be used over the second interface, the abstract URI comprising an end-point and domain name and path of the resource and being independent of the protocol used to access the resource; receiving over the second interface and resolve a look-up URI for the resource, the look-up URI comprising the address of the apparatus, optional domain and end-point parameters and optional metadata related to the resource; and linking the URL and the abstract URI together and the look-up URI with one or more URLs or abstract URIs.

Disclosed embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

The exchanges of interoperable messages using APIs (Application Program Interfaces) provided by servers on the Internet are realized by using web services. A web service can be realized in many ways, usually by using a REST (Representational State Transfer) design with the built-in features of a web protocol like HTTP and payload encoding with Extensible Markup Language (XML), or realized as a remote procedure call via SOAP (Simple Object Access Protocol).

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

FIG. 1 illustrates an example of a web service system architecture to which disclosed embodiments may be applied. In at least one disclosed embodiment, the system is configured to efficiently enable one or more backend web applications 102 to make use of constrained embedded nodes 106 over constrained networks 112. The communication is based on IP and a RESTful web service architecture end-to-end. Furthermore, unlike prior art systems that use full web services end-to-end, the proposed system is more efficient and scalable—also being applicable to a much wider range of devices and networks at a lower cost and battery consumption.

The architecture consists of a server 104, which hosts backend components of the system. Such a server can be realized on anything from a standard personal computer (PC) to a server cloud. The server components can be located on the same apparatus, or distributed across a cluster. Disclosed embodiments are designed to scale from small M2M systems (1000s of nodes) to very large M2M systems (100s of millions of nodes).

The server 104 provides a web service interface 108 to web applications 102 that make use of embedded node resources. The web application may be application run in a browser or in standalone software. The application or software may be run in an apparatus capable of Internet communication. The server is configured to communicate using optimized embedded web service algorithms and protocols with nodes 106 over the M2M interface 110. The architecture includes the ability to cluster the backend server across multiple physical or virtual machines (called private or public cloud computing).

The constrained nodes 106 in the system have limited memory and processing capabilities, may sleep most of the time, and often operate using a constrained network technology 112. Nodes communicate with local proxies or servers using an M2M interface 110. Each node contains resource registration related functionality among other things. The nodes comprise one or more resources which may be utilized by the web applications.

The embedded M2M devices or nodes 106 can be connected to the server 104 via IP either directly or via the proxy (not shown). The interface between the nodes and the server 104 are realized using a binary web service protocol over IP. The M2M devices 106 reside in a constrained network 112 over which traditional protocols would be too inefficient. The constrained or low-power wireless network may be a multi-hop network comprising a set of wireless low-power nodes. In this simplified example, one node 106 is illustrated.

In at least one disclosed embodiment, the wireless links in the wireless network 112 may be realized by using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

Figure 2:
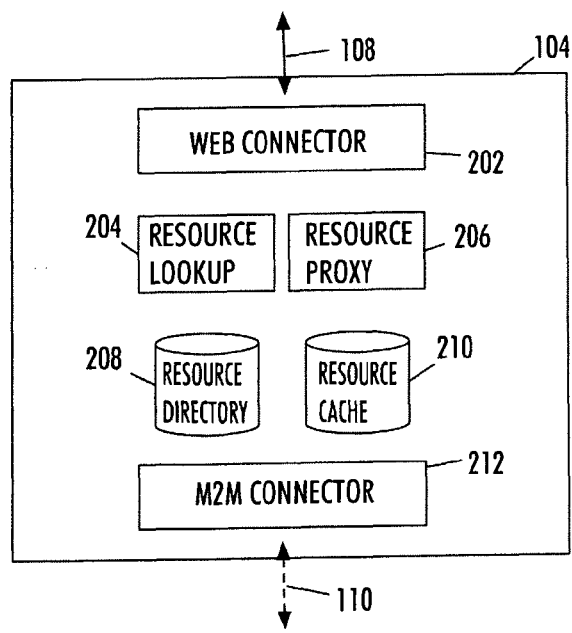
FIG. 2 illustrates an example of a server.

FIG. 2 illustrates an example of a server 104. The server may consist of several components. The server comprises a binary M2M interface 110 to communicate with nodes or end-points operationally connected to the server using a binary web service (binary web protocol and payload) for example with the CoAP protocol. Other protocols such as SMS or optimized HTTP are also supported. The interface for each protocol is realized in the server using an M2M Connector 212. The M2M connector may be denoted as a first interface.

The server may be used by one or more web applications 102 over a web interface 108. The interface 108 is typically realized over HTTP with XML or JSON payload content where JSON (JavaScript Object Notation) is a known data-interchange format. Mentioned realizations are merely examples as the architecture of the server is transparent to payload type. In at least one disclosed embodiment, the interaction of the web applications with the server over the interface 108 uses the REST paradigm. Alternative protocols may be supported, e.g. JMS (Java Message Service) for communication with enterprise Java components, or CoAP when efficiency is needed e.g. when communicating with mobile devices. The interfaces may be realized in the with a web connector 202 for each protocol supported by the interface. The web connectors realize abstract REST interfaces used by the other server components to access the different protocols available. This makes it possible for to support a new protocol without changing other server components. The web connectors may be denoted as a second interface.

The server further comprises a Resource Directory 208. The server is configured to receive registrations of constrained nodes or end-points 106 operationally connected to the server. The end-points or nodes and their web resources (path) along with other meta-data are registered with the Resource Directory either directly by the node or by another third party. Thus, the Resource Directory is a registry of the resources below the server in the M2M network. This way the Resource Directory eliminates the need for management tools to probe the M2M network directly (which is very inefficient). The Resource Directory may be realized using a processor and a storing device such as a hard disc drive and a suitable application, for example. The Resource Directory may be realized as a database application in a computer or it may be realized using cloud computing.

The server further comprises a Resource Cache 210. The Resource Cache is a temporary cache of the most recent representation (latest payload value) of node resources. The cache 210 is accessed any time the server receives a request for a resource. The cache is updated any time a response is made. This caching greatly improves efficiency as subsequent requests for that resource are fetched internally rather than loading the constrained M2M network. The Resource Cache may be realized as an application in a computer or it may be realized using cloud computing.

In at least one disclosed embodiment, the server comprises a Resource Lookup 204 which is configured to provide a lookup interface for web applications 102 and other internal components to discover end-points and resources. A web application or internal component may send a lookup request to the server and the Resource Lookup 204 is configured to handle these requests and reply with necessary information. With the knowledge of the domain, the end-point and a resource a web application or internal component can make a resource request. These requests are handled by a Resource Proxy 206 and the Resource Cache 210. The Resource Proxy is first configured to check if a local cached copy of the requested resource is available. If a valid copy is found, it may be sent as a reply. If the cache does not have a copy of the resource it is requested from the node via an M2M Connector 212. The Resource Lookup and Resource Proxy may be realized using a processor and a storing device such as a hard disc drive and a suitable application, for example. They may be realized as applications in a computer or using cloud computing.

In at least one disclosed embodiment, the server is configured to utilize a multi-level resource address resolution mechanism that allows abstract identifiers to be used by a web application to interact with M2M resources regardless of their actual protocol or location, but at the same time preserving REST end-to-end.

Generally on the web today just a single Universal Resource Identifier URI is used to indicate a web resource to be accessed. This URI is usually called a Universal Resource Locator URL, as it identifies the actual location of the resource. For example http://www.example.com/resource points to the /resource path that is to be accessed using HTTP (default port 80) on the IP address that Domain Name System DNS resolves from www.example.com. The use of URLs for M2M applications has many problems, including problems to maintain DNS, mobility and dependence on a single protocol. If the resource is available via multiple protocols, it is hard to manage this with a single URI. The same applies if the protocol from which it is available changes over time, for example due to mobility across different networks with different firewall settings.

Furthermore, in M2M application context and meta-data is important, and this is difficult to express in a URL.

Figure 3:
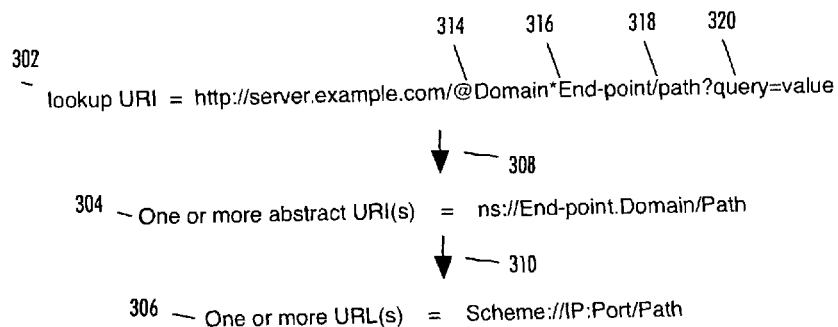
FIG. 3 illustrates an example of a multilevel addressing mechanism.

FIG. 3 illustrates an example of the multilevel addressing mechanism. As mentioned above, the server is configured to receive registrations of constrained nodes or end-points 106 operationally connected to the server. The end-points or nodes and their web resources (path) along with other meta-data are registered with the Resource Directory 208. The Resource Directory is configured to create and store a universal resource locator (URL) 306 for a resource to be used over the binary interface 216. The low-level URL comprises the protocol used to access the resources on the end-point (coap://, http:// or sms://, for example), the Internet Protocol address, port and path of the resource along with an optional query string. DNS is not needed to resolve the URL as the actual IP address and port of the end-point are stored in the Resource Directory.

In order to enable other internal components and web applications contacting the server the web connector interface 202 to be able to access end-points even in the case the end-point has moved and thus the URL pointing to the end-point being changed, the Resource Directory is configured to use an abstract universal resource identifier URI 304 to identify end-points, domains and their resources. This URI is independent of the protocol used to actually access the end-point on the M2M interface, and transparent to any changes in the IP address or port of the end-point. Instead, the URI identifies an end-point by an end-point name and domain, along with the path of the resource and optionally a query string. The end-point name and domain of each registered end-point are assigned to a Resource Directory entry during registration. They can either be included in the registration message, or assigned by the Resource Directory in their absence. The server is configured to link low-level the URL and the abstract URI together so that they point to the same end-point or resource.

The web applications are configured to use a third level look-up URI 302 for looking up and interacting with the resources from a server. In the server, the Resource Lookup 204 is configured to receive from the web applications over the interface 202 these look-up URIs for the resources. A look-up URI comprises the address of the server, optional domain and end-point parameters and optional metadata related to a resource or resources.

The lookup interface of the 104 server is usually realized as an HTTP interface located at a domain name (http://server.example.com) in the example of FIG. 3. This part of the URI is resolved as normally. In this example, it consists of a domain part 314, an end-point part 316, followed by segments that can contain the resource path 318, or other identifiers (for example a group tag. The lookup URI may also have an optional query string part, which can contain meta-data related to the domain, end-point or resource that help in filtering the results of a lookup.

The server is configured to resolve the look-up URI and link it to an abstract URI or URIs if the look-up URI points to a resolvable address or addresses. If the result of the resolved URI does not point to a resolvable address the server is configured to return another look-up URI to the web application so that the application can further define the look-up.

In at least one disclosed embodiment, the multi-level URI process has three steps. First a web application forms its look-up for M2M end-points or resources in the lookup URI form 302. This look-up URI is then requested 308 from the server. The server's Resource Lookup and Resource Directory components then work together to resolve the abstract URIs that match the look-up 308. A look-up may also result in more look-up URIs, which are used for recursive look-ups. For example just looking up a domain will result in the end-point look-up URIs that belong to the domain. Next, the web application will use the abstract URIs that it found via look-up to actually access resources, for example through the Proxy interface. When an abstract URI is requested, the Resource Cache is first checked for any cached copies of that resource (identified by the abstract URI). If no cached copies are available, then the Resource Directory is asked 310 to resolve the abstract URI to the current URL of that resource. Finally, the M2M connector 212 makes the resource request using that URL.

Figure 4:
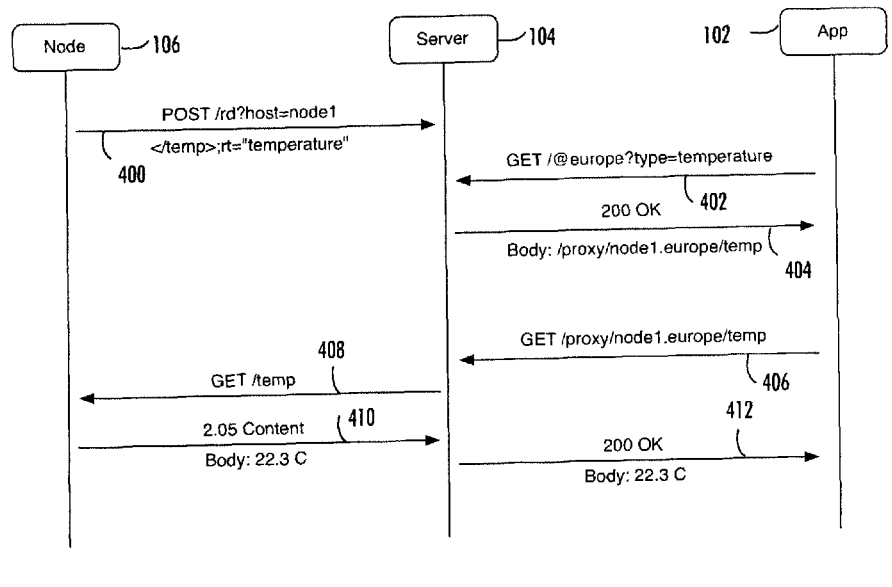
FIG. 4 illustrates an example of a message exchange diagram for look-up and resource access process.

FIG. 4 illustrates an example of a message exchange diagram between a web application 102, a server 104 and a node 106 for the look-up and resource access process. In the example of FIG. 4, the messages between the node 106 and the server 104 utilize a CoAP M2M interface and messages between the server 104 and the web application 102 utilize an HTTP web interface.

First an end-point of the node 106 registers 400 with the Resource Directory of the server 104. This step is further explained below in association with FIG. 8. In this example, the node is node1 and the resource path is /temp. The Resource Directory creates and stores the low-level URI of the resource. In this example it is assumed that the node belongs to a domain called "europe". The Resource Directory creates and stores an abstract URI for the resource.

At some point, the web application performs a look-up by accessing the HTTP interface of the server by forming a lookup URI 402. In this case it looks for any resource of type "temperature" in the domain "europe". The server 104 performs a look-up and abstract URI resolution process as will be described in detail below in connection with FIG. 6. The server 104 returns 404 a body with a link to the proxy interface of the server, including the abstract URI of the resource. If several resources would have matched that type, then a link for each would be returned.

As the look-up resolved to an abstract URI, the web application 102 can then retrieve the resource by making a GET request 406 to the link. Now the server checks the cache, and then if no representation is available, performs resolution from the abstract URI to the URL as will be illustrated below in connection with FIG. 7. Then the M2M connector requests 408 the resource from the node, receives 410 the resource, caches it and returns 412 it to the web application.

For example, assume an example domain under the server 104 where the domain comprises three nodes, node1, node2 and node3. The node 1 comprises three resources: temperature, light and motion. Node2 and node3 comprise a temperature resource.

To get information on the nodes in domain "europe" a web application could send following look-up URI to the server:
GET http://server.example.com/@europe
The server would generate a following response:
200 OK
http://server.example.com/@europe*node1
http://server.example.com/@europe*node2
http://server.example.com/@europe*node3
Thus, a look-up URI defining each node is returned to the web application. To get information on the resources of node1 the web application could send following look-up URI to the server:
GET http://server.example.com/@europe*node1

Figure 5:
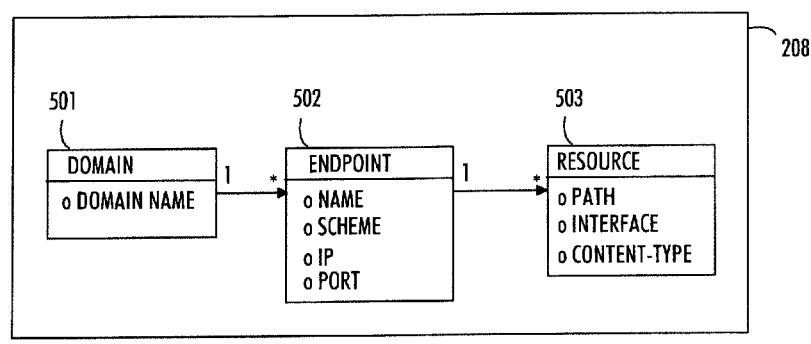
FIG. 5 illustrates an example of the database structure of the Resource Directory.

In this case, the server would generate a following response:
200 OK
http://server.example.com/proxy/node1.europe/temperature
http://server.example.com/proxy/node1.europe/light
http://server.example.com/proxy/node1.europe/motion
Thus, an abstract URI defining each resource is returned to the web application. To get information on all the temperature resources of domain "Europe" the web application could send following look-up URI to the server:
GET http://server.example.com/@europe?type=temperature
In the above request, the section "?type=temperature" is an example of possible optional query options. The server would return following response, i.e. an abstract URI defining each resource:
200 OK
http://server.example.com/proxy/node1.europe/temperature
http://server.example.com/proxy/node2.europe/temperature
http://server.example.com/proxy/node3.europe/temperature FIG. 5 illustrates an example of the database structure of the Resource Directory 208. The Resource Directory database comprises domains 501 as the main level element. Each domain 501 can each contain multiple end-points 502. End-point data 502 comprises information on the name of the end-point, the scheme used to access the end-point, the IP address of the end-point and the port to use. Each endpoint 502 can in turn have multiple resources 503. The resource data comprises information on the path, interface and content-type of the resource.

Figure 6:
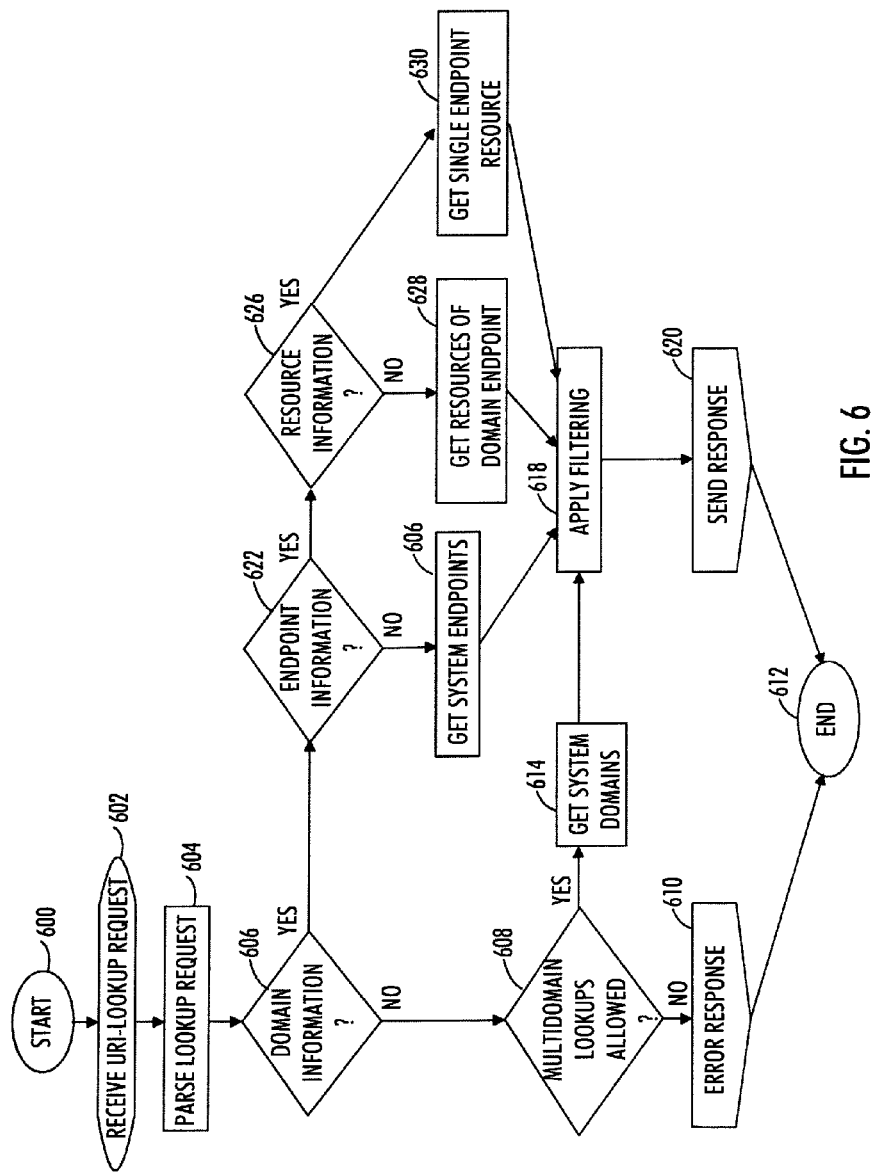
FIG. 6 is a flowchart illustrating an example of look-up process.

FIG. 6 is a flowchart illustrating an example of the look-up process. FIGS. 3 and 5 are also referred below. The process starts at step 600.

In step 602, a server receives a look-up URI request via web connector interface 202. The request may be of the form described above and comprise different optional query options.

In step 604, the request is parsed and the request structure validity is checked. Invalid request is rejected (not shown).

In step 606, the availability of domain information 314 in the request is checked. If domain information is not present, the server is configured to check in step 608 if request that don't specify domain information are allowed. If not, an error response is returned via the web connector interface in step 610 and the process ends in step 612.

If requests without domain information are allowed the process continues in step 614 by retrieving the available domains 501 from the Resource Directory.

In step 618, the obtained information is filtered according to the requested query options 320 of the look-up request.

In step 620, the response and the filtered results are returned via the web connector interface and the process ends in step 612.

If domain information 314 was detected in step 606, the process continues in step 622 where the request is checked for end-point information 316 in step 622.

If end-point information is not present, end-points 502 having the domain element 314 matching Resource Directory data base domain 501 are retrieved in step 624.

In step 618, the obtained end-point set is filtered according to the requested query options 320 of the look-up request.

In step 620, the response and the filtered results are returned via the web connector interface and the process ends in step 612.

If end-point information 316 was detected in step 622, the process continues in step 626 where the request is checked for resource element 318.

If resource element 318 is not present, the resources 503 that are associated with end-point 502 where end-point 502 and request end-point element 316 and domain 501 and request domain element 314 match are retrieved from Resource Directory data base in step 628.

In step 618, the obtained resource set is filtered according to the requested query options 320 of the look-up request.

In step 620, the response and the filtered results are returned via the web connector interface and the process ends in step 612.

If resource element 318 was detected in step 626, the process continues in step 630 where a single resource where request domain element 314 matches 501 Resource Directory-domain, the end-point element 316 matches Resource Directory-end-point 502 and resource element 318 matches Resource Directory-resource 503 is retrieved from Resource Directory data base In step 618, the obtained single resource is filtered according to the requested query options 320 of the look-up request.

In step 620, the response and the filtered results are returned via the web connector interface and the process ends in step 612.

Figure 7:
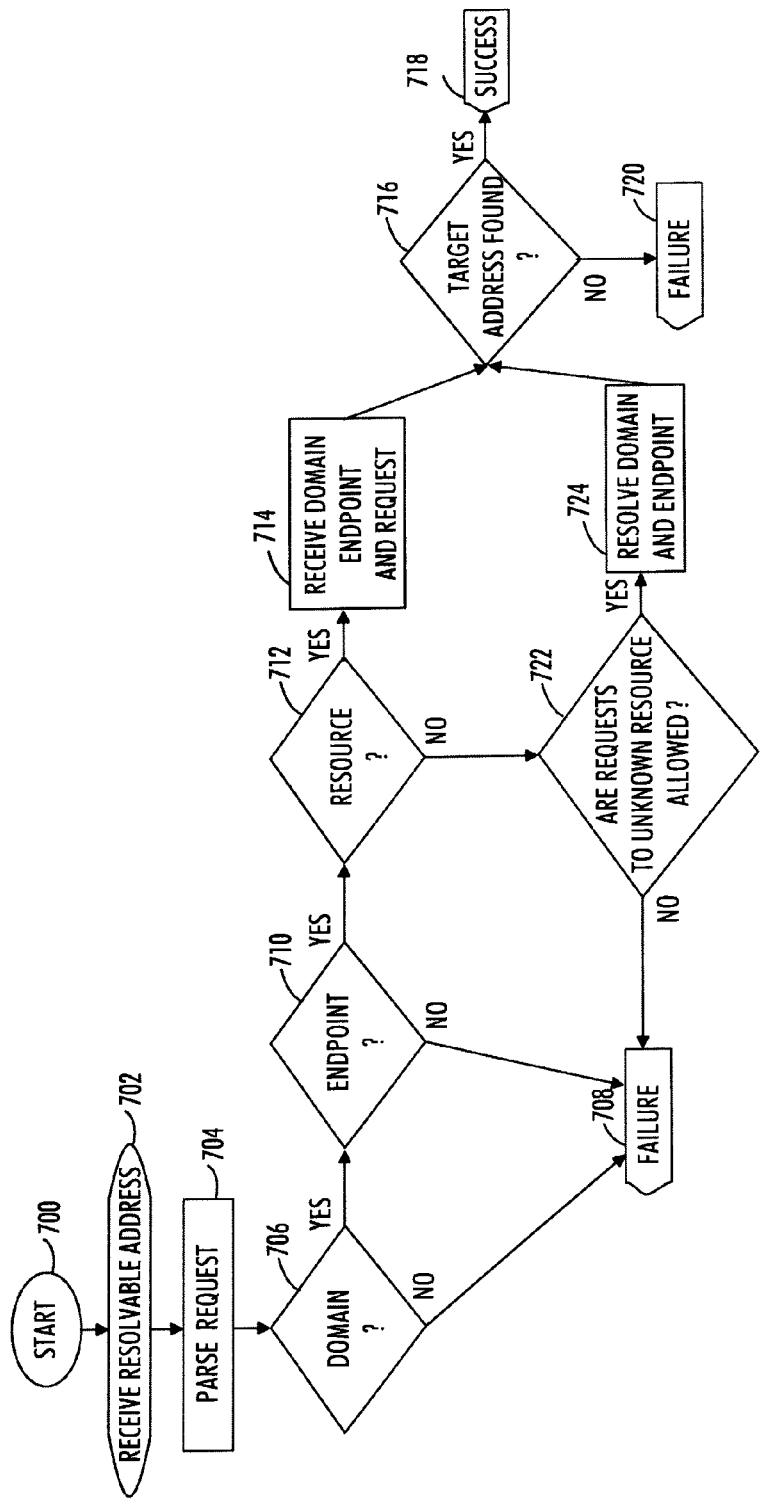
FIG. 7 is a flowchart illustrating an example of the resolution from abstract URI to low-level URL.

FIG. 7 is a flowchart illustrating an example of the resolution from the abstract URI 302 to the URL 306. FIG. 3 is also referred below. The process starts at step 700.

In step 702, a request with a resolvable address is received.

In step 704, the request is parsed.

In step 706, the availability of domain information 314 in the abstract address in the request is checked. If domain information is not present the resolution fails 708.

In step 710, is it checked that the abstract address in the request comprises unique end-point information 316. If end-point information is not present the resolution fails 708.

In step 712, is it checked that the abstract address in the request comprises resource information 318. If resource information is found physical address information (the low-level URI) 304 is searched from the Resource Directory database in step 714.

In step 716 it is checked if matching the low-level URI is found and thus the resolution succeeds 718. Otherwise the resolution fails 720.

In at least one disclosed embodiment, the server can allow requests to endpoint resources 316 that haven't been registered to the system as known resources.

If in step 712 it was noted that resource information was not present it may be checked in step 722 whether requests without resource information are allowed. If not, requests missing resource part in the request result always to failure 708.

If requests are without resource information allowed the request domain and endpoint are resolved from Resource Directory database in step 724.

In step 716 it is checked if matching the low-level URI is found and thus the resolution succeeds 718. Otherwise the resolution fails 720.

Figure 8:
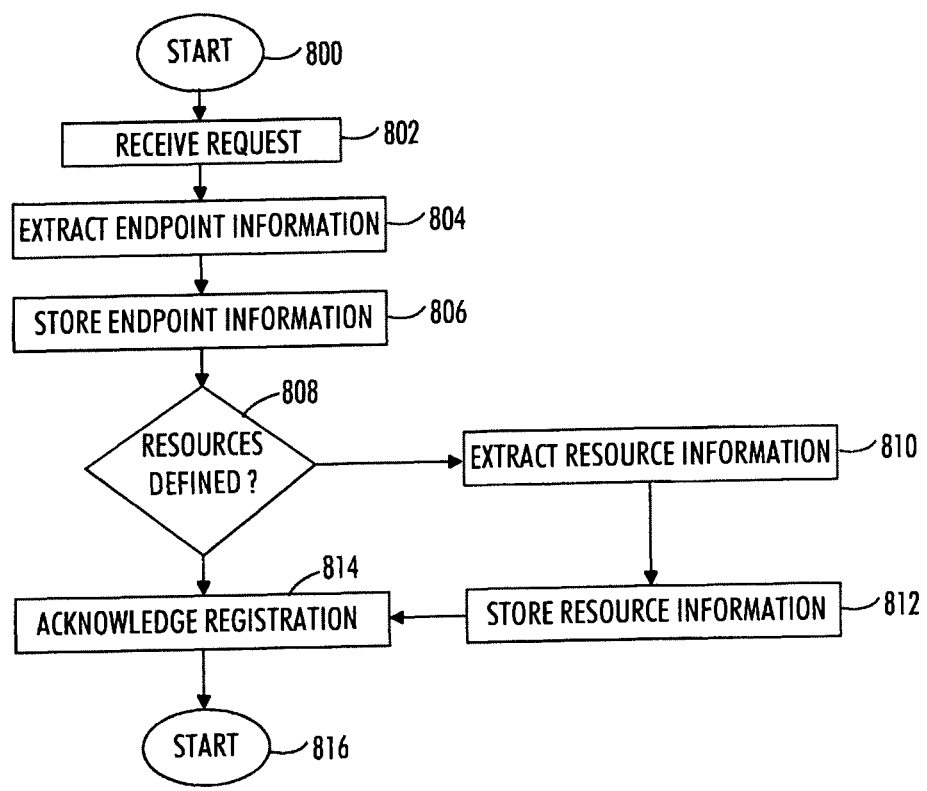
FIG. 8 is a flowchart illustrating an example of end-point registration.

FIG. 8 is a flowchart illustrating an example of end-point registration. The process starts at step 800.

In step 802, an end-point registration request is received through M2M interface 216. The request may be parsed and the validity of the request is checked. Invalid request is rejected (not shown).

In step 804, the information that corresponds with Resource Directory end-point is extracted.

In step 806, the information is stored.

In step 808, it is checked whether the registration message comprises resources defined for the end-point. If no, the process continues in step 814.

If yes, the resources and their metadata corresponding to Resource Directory resource 503 are extracted from the message in step 810.

In step 812, end-point resources are stored to the Resource Directory data base.

In step 814, an acknowledgement regarding the registration is sent through the M2M interface 216.

The process ends in step 816.

Figure 9:
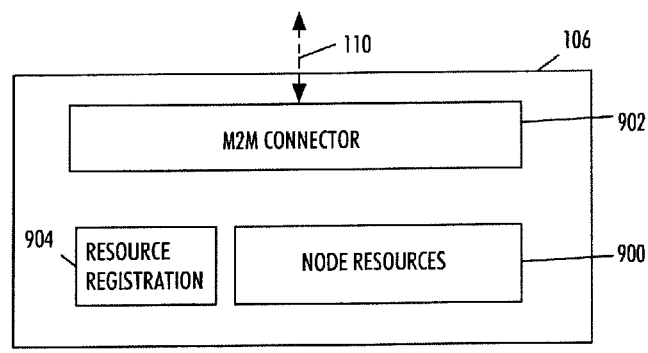
FIG. 9 illustrates an example of an end-point.

FIG. 9 shows an example of the structure of an end-point or a node 106. An end-point has one or more device applications, each registering resources with the end-point Resources component 900. When the resources have been registered, the Resource Registration component 902 discovers the location of a Resource Directory for its appropriate domain and then registers itself and its resource over the M2M interface 110 using the M2M Connector 904.

End-point or end-points may have resources of different types registered. A basic type of resource is one which may have a given value. A web application may request the end-point the value (via the server). The end-point is configured to read the value and report it back to the web application (via the server) typically immediately after receiving the request.

In at least one disclosed embodiment, the apparatus may be realized as software in a server, an end-point or a node, a computer or a set of computers connected to Internet and a binary web service domain directly or via a proxy router or server. For example, the Web Connectors 202, M2M Connectors 212, 904, Resource look-up 204 and Resource Proxy 206 components may be realized in software in whole or in part or with electronic circuitries dedicated for the described purposes. Resource Directory 208 and Resource Cache 210 may be realized in software in whole or in part or with memory circuitries known in the art.

The computer programs may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

In at least one disclosed embodiment, the apparatus comprises means for communicating with end-points using a binary web service over a first interface, the end-points comprising one or more resources; means for communicating over a second interface with web applications making use of the resources; means for creating an universal resource locator (URL) for a resource to be used over the binary interface, the URL comprising the protocol used to access the resource, the Internet Protocol address and, port and path of the resource; means for creating an abstract universal resource identifier (URI) for the resource to be used over the second interface, the abstract URI comprising an end-point and domain name and path of the resource and being independent of the protocol used to access the resource; means for receiving over the second interface and resolve a look-up URI for the resource, the look-up URI comprising the address of the apparatus, optional domain and end-point parameters and optional metadata related to the resource; and means for linking the URL and the abstract URI together and the look-up URI with one or more URLs or abstract URIs.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
   a first interface to communicate with end-points operationally connected to the apparatus using a binary web service, the end-points comprising one or more resources;
   a second interface for communicating with web applications making use of the resources;
   a component for creating a universal resource locator (URL) for a resource to be used over the first interface, the URL comprising the protocol used to access the resource, the Internet Protocol address, port and path of the resource;
   a component for creating an abstract universal resource identifier (URI) for the resource to be used over the second interface, the abstract URI comprising an end-point and domain name and path of the resource and being independent of the protocol used to access the resource;
   a component configured to receive over the second interface and resolve a look-up URI for the resource, the look-up URI comprising the address of the apparatus, optional domain and end-point parameters and optional metadata related to the resource; and
   a component configured to link the URL and the abstract URI together and the look-up URI with one or more URLs or abstract URIs.

2. The apparatus of claim 1, wherein the apparatus is configured to create or resolve URL, abstract URI and look-up URI comprising a query string with metadata related to a resource.

3. The apparatus of claim 1, wherein the apparatus is configured to receive and resolve the look-up URI comprising one or more identifiers of a resource.

4. The apparatus of claim 1, configured to resolve a received look-up URI and send a reply with a linked abstract URI or another look-up URI.

5. The apparatus of claim 1, wherein the apparatus is configured to return a linked abstract URI if the received look-up URI points to a resolvable address, and otherwise another look-up URI.

6. The apparatus of claim 1, further comprising:
   a resource directory for storing the URL and the abstract URI of the resources; and
   a resource cache for storing information received from the resources.

7. A system, comprising:
   a server and one or more end-points operationally connected to the server using a binary web service, the end-points comprising one or more resources;
   a first interface in the server to communicate with end-points operationally connected to the apparatus using a binary web service, the end-points comprising one or more resources;
   a second interface in the server for communicating with web applications making use of the resources;
   a component in the server for creating a universal resource locator (URL) for a resource to be used over the first interface, the URL comprising the protocol used to access the resource, the Internet Protocol address, port and path of the resource;
   a component in the server for creating an abstract universal resource identifier (URI) for the resource to be used over the second interface, the abstract URI comprising an end-point and domain name and path of the resource and being independent of the protocol used to access the resource;
   a component in the server configured to receive over the second interface and resolve a look-up URI for the resource, the look-up URI comprising the address of the apparatus, optional domain and end-point parameters and optional metadata related to the resource; and
   a component in the server configured to link the URL and the abstract URI together and the look-up URI with one or more URLs or abstract URIs.

8. A method, comprising:
   communicating with end-points using a binary web service over a first interface, the end-points comprising one or more resources;
   communicating over a second interface with web applications making use of the resources;
   creating a universal resource locator (URL) for a resource to be used over the first interface, the URL comprising the protocol used to access the resource, the Internet Protocol address, port and path of the resource;
   creating an abstract universal resource identifier (URI) for the resource to be used over the second interface, the abstract URI comprising an end-point and domain name and path of the resource and being independent of the protocol used to access the resource;
   receiving over the second interface and resolve a look-up URI for the resource, the look-up URI comprising the address of the apparatus, optional domain and end-point parameters and optional metadata related to the resource; and
   linking the URL and the abstract URI together and the look-up URI with one or more URLs or abstract URIs.

9. The method of claim 8, further comprising:
   creating or resolving URL, abstract URI and look-up URI comprising a query string with metadata related to a resource.

10. The method of claim 8, further comprising:
    receiving and resolving look-up URI comprising one or more identifiers of a resource.

11. The method of claim 8, further comprising:
    resolving a received look-up URI and sending a reply with a linked abstract URI or another look-up URI.

12. The method of claim 8, further comprising:
    returning a linked abstract URI if the received look-up URI points to a resolvable address, and otherwise another look-up URI.

13. The method of claim 8, further comprising:
    storing the URL and the abstract URI of the resources in a resource directory; and
    storing information received from the resources in a resource cache.

14. A non-transitory computer readable medium comprising a set of instructions, which, when executed by a processor, causes the processor to:
    communicate with end-points using a binary web service over a first interface, the end-points comprising one or more resources;
    communicate over a second interface with web applications making use of the resources;
    create a universal resource locator (URL) for a resource to be used over the first interface, the URL comprising the protocol used to access the resource, the Internet Protocol address, port and path of the resource;
    create an abstract universal resource identifier (URI) for the resource to be used over the second interface, the abstract URI comprising an end-point and domain name and path of the resource and being independent of the protocol used to access the resource;

receive over the second interface and resolve a look-up URI for the resource, the look-up URI comprising the address of the apparatus, optional domain and end-point parameters and optional metadata related to the resource; and link the URL and the abstract URI together and the look-up URI with one or more URLs or abstract URIs.

* * * * *